United States Patent [19]

Leiber

[11] Patent Number: 4,472,000
[45] Date of Patent: Sep. 18, 1984

[54] ANTI-BLOCKING CONTROL SYSTEM

[75] Inventor: Heinz Leiber, Oberriexingen, Fed. Rep. of Germany

[73] Assignee: Robert-Bosch GmbH, Stuttgart, Fed. Rep. of Germany

[21] Appl. No.: 415,943

[22] Filed: Sep. 8, 1982

[30] Foreign Application Priority Data

Apr. 7, 1982 [DE] Fed. Rep. of Germany ....... 3213007

[51] Int. Cl.³ .............................................. B60T 8/02
[52] U.S. Cl. ..................................... 303/6 A; 303/117
[58] Field of Search ............... 303/6 A, 119, 117, 116, 303/114, 113, 111, 68–69, 61–63, 15, 6 R; 188/345, 354, 181 A, 16, 181 R, 181 C; 251/30; 137/595; 335/255, 256, 257, 274

[56] References Cited

U.S. PATENT DOCUMENTS 3,512,843  5/1970  Cannella ............................ 303/15 X
3,514,161  5/1970  Frayer ................................ 303/117
4,155,604  5/1979  Fenart ................................ 303/119

FOREIGN PATENT DOCUMENTS 2026114  1/1980  United Kingdom ............... 303/119

Primary Examiner—Douglas C. Butler
Attorney, Agent, or Firm—Edwin E. Greigg

[57] ABSTRACT

An anti-blocking control system for a vehicle with two brake circuits, in which the regulation of the brake pressure is achieved either at a wheel and/or the wheels of an axle by both brake circuits and in which the pressure generated in this manner at the wheel(s) is jointly varied in case of a tendency to block. In order to simplify this brake pressure variation, a valve arrangement is used, consisting of a magnetic member with a coil and an armature as well as of a valve member having two separate valves disposed in the brake lines to the wheel(s). These two valves are jointly operated by the magnetic member.

4 Claims, 4 Drawing Figures

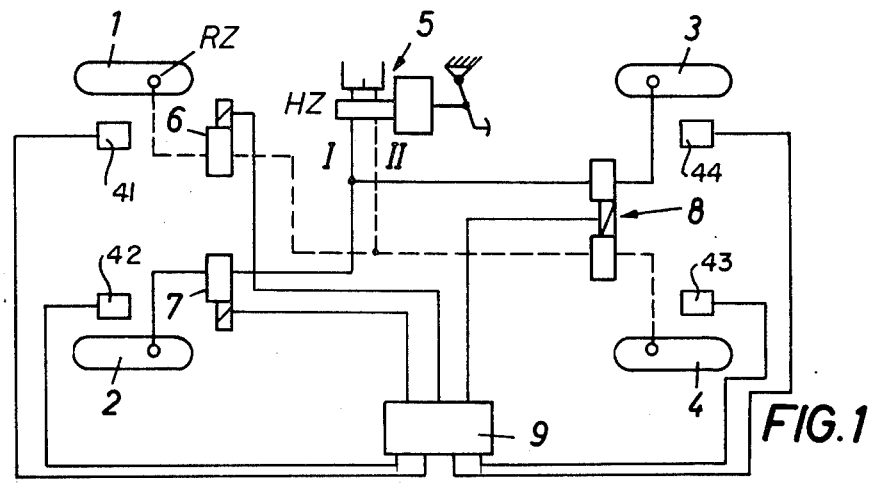
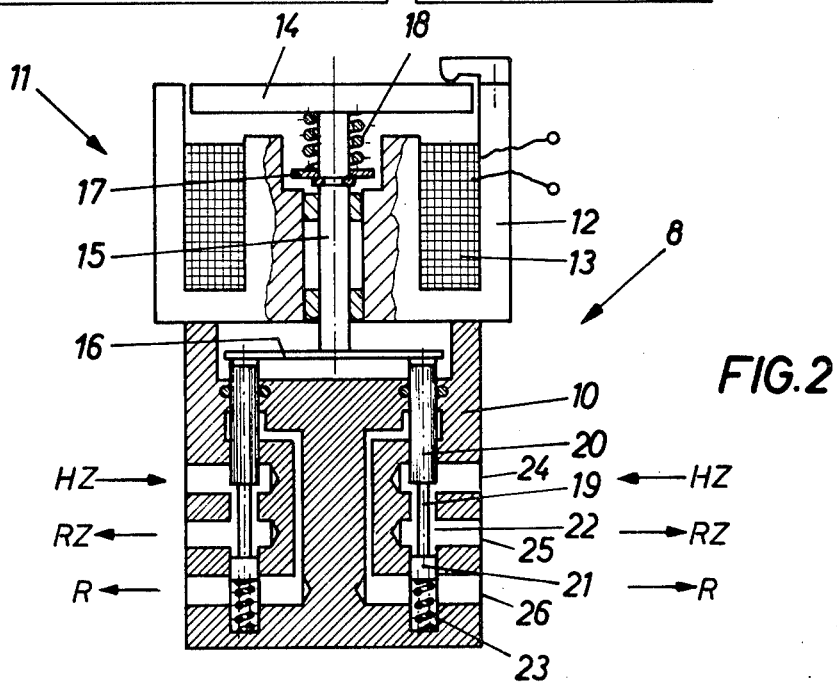
FIG. 2
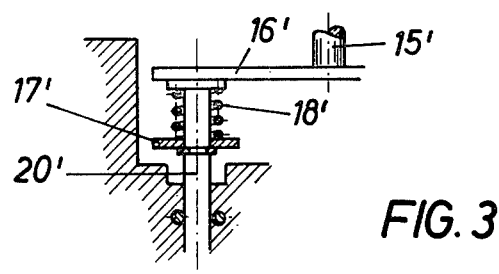
FIG. 3

ANTI-BLOCKING CONTROL SYSTEM

BACKGROUND OF THE INVENTION

The present invention relates to an anti-blocking control system for a vehicle with dual brake circuits, wherein brake pressure is generated by means of both brake circuits at one and/or both wheels of an axle of the vehicle, the brake circuits consisting of data transmitters assigned to the wheels of the vehicle for the determination of the wheel movement attitude, of an analytic circuit to which the signals from these data transmitters are sent and which transforms them to brake pressure control signals, and of control valves for the control of the brake pressure at the wheel brakes. The brake pressure at the wheel(s) is varied jointly for both brake circuits.

While, by virtue of the use of the presently common joint variation of the brake pressure at the brakes of the rear axle, for instance in accordance with the so-called "select-low" operation, a considerable savings is realized when compared with the 4-wheel control (only one valve and one output stage for their control), when the brake circuits are split between the front and rear wheels, so far two valves are needed for the control of the brake pressure at the wheels of the rear axle of a vehicle with diagonal brake circuit division, because of the separation of the brake circuits. For reasons of safety it is even necessary to control these valves via separate output stages, since otherwise a defect at a valve coil cannot be detected, except with considerable effort, and a single-circuit control during such a defect is not permissible.

This also holds for brake circuit divisions in which the wheel brake is operated by way of both brake circuits.

OBJECT AND SUMMARY OF THE INVENTION

The present invention is designed to reduce the outlay necessary for the common control in vehicles with such a brake circuit division.

Besides the advantages of a synchronous pressure control at both wheels and the savings of an output stage, inclusive of control line and of a magnet, space is saved in addition.

In the embodiment in accordance with the present invention, the valves are preferably constructed as multiposition valves, especially triple position valves, wherein the magnet can be charged with differently staged output for the control of the several positions and wherein the electromagnet and/or the valves contain socalled pre-positioned barrier springs, which only begin to act after the intermediate position has been reached. The control output and the force of these springs have to be adjusted to each other in such a manner that with a predetermined control output the valves reach a determined position.

The valves can be embodied as slide valves or as seat valves. Furthermore, the invention can also be used for brake systems with direct activation of a main brake cylinder (open systems) or for full power systems (closed systems).

The invention will be better understood and further objects and advantages thereof will become more apparent from the ensuring detailed description of preferred embodiments taken in conjunction with the drawings.

BRIEF DESCRIPTION OF THE DRAWINGS

Exemplary embodiments of the present invention are illustrated by the drawings.

FIG. 1 shows a schematic view of a vehicle with diagonal brake circuit division and with a valve in accordance with the present invention;

FIG. 2 shows the possible construction of such a valve;

FIG. 3 shows an alternate mounting of the barrier spring of FIG. 2; and

DESCRIPTION OF THE PREFERRED EMBODIMENTS

Figure 4:
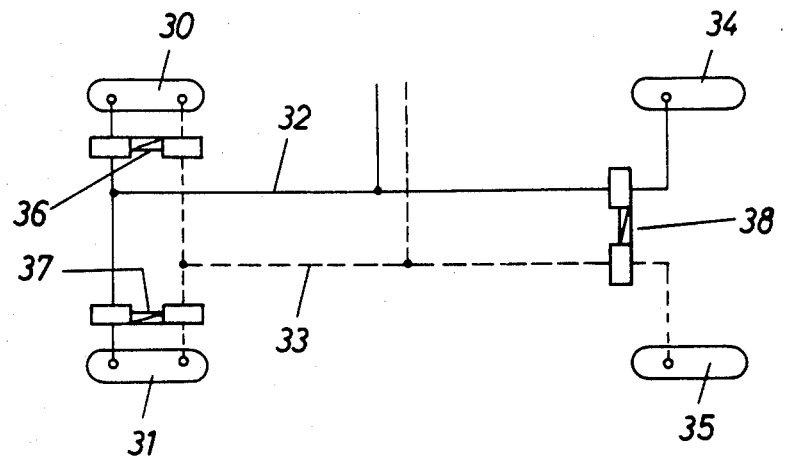
FIG. 4 shows another brake circuit division for which the present invention can be used.

In FIG. 1, the front wheels are designated 1 and 2 and the rear wheels 3 and 4. A solidly drawn brake circuit leads from a main brake cylinder 5 to the wheels 2 and 3 and a brake circuit drawn with dotted lines leads to wheels 1 and 4. Magnetic control valves 6 and 7 are disposed in the brake lines leading to the front wheels 1 and 2. In the brake lines leading to the rear wheels, however, the double valve 8, built according to the present invention, is disposed. Brake pressure control signals are brought to the three valves 6–8 by an analytic element 9, which receives signals derived from well known data transmitters 41-44 located relative to each wheel in order to determine the wheel movement attitude of the wheels 1–4.

FIG. 2 shows a possible embodiment of the double valve 8 of FIG. 1. It consists of a block 10, which has two triple position slide valves built in, and of an electromagnet 11 disposed thereon.

The electromagnet 11 comprises a cup-shaped stator 12 with a coil 13 and an armature 14 disposed therein. The armature 14 is equipped with a plunger 15 placed axially movable on the stator 12, which transfers the movements of the armature to a plate 16. A barrier spring 18, fastened between the armature 14 and a disc 17, fastened to the plunger, surrounds the plunger 15. The valves, which are operated by the armature 14 via the plate 16, each comprises two slides 20 and 21, connected by a rod 19, which are mutually slidable in the bore 22, and of a return spring 23. The bore 22 has three connectors 24–26, which are connected with the main brake cylinder (24), the wheel brake cylinder (25) and the return line (26).

In the starting position the connectors 24 and 25 are connected to each other. This makes pressure generation possible. If the coil 13 is charged with a first (small) control output, the armature 14 with the plunger 15 moves downwardly until the disc 17 touches the stator 12. The control output is insufficient to overcome the force of the barrier spring 18, which can be tensioned even more by the displacement of the disc 17 relative to the plunger 15. In this intermediate position the slide 20 closes the connection between the connectors 24 and 25, and the connection of the connectors 25 and 26 remains interrupted by the slide 21 (keeping the pressure constant).

Only when by means of a higher control output the force of the barrier spring 18 is overcome and the armature 14 is moved further until it firmly touches the stator 12, -with continued interruption of the connection between the connectors 24 and 25-the connection between the connectors 25 and 26 are opened, so that pressure release can take place. The construction of the valve slide is kept especially simple in view of its small size. Instead of the normal annular grooves for pressure relief, the diameter of the connecting line has been chosen to be larger than the diameter of the slide. This assures a simple pressure relief method. Furthermore, the slide gasket is outwardly stressed by only relatively low pressure, which results in small displacement forces.

In FIG. 3 part of the drawing of FIG. 2 is shown, namely parts 15', 16' and 20', corresponding to parts 15, 16 and 20. However, now the barrier spring 18' is shown surrounding the slide 20' and fastened between the plate 16' and the disc 17'.

A vehicle with a different brake circuit division is shown in FIG. 4, for which the present invention is also usable. Here the brake pressure at the front wheels 30 and 31 is derived from the two brake circuits 32 and 33, wherein the brake circuits remain separated from one another. The brakes of the rear wheels 34 and 35 are also operated from separate brake circuits 32 and 33. In this case three dual-valve arrangements 36 to 38, designed in accordance with the present invention, can be used, since the brake pressure at the single wheels 30 and 31 as well as at the wheels 34/35 of the rear axle, coming from separate brake circuits, is intended to be commonly controlled.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An anti-blocking control system for a vehicle with two brake circuits, wherein the generation of the brake pressure at the wheels of an axle takes place by means of both brake circuits, comprising data transmitters assigned to the vehicle wheels for the determination of the wheel movement attitude, an analytic circuit to which the signals from these data transmitters are fed and which transforms them into brake pressure control signals, and control valves for the control of the brake pressure at the wheel brakes, wherein the brake pressure at the wheels(s) is jointly varied for both brake circuits, which comprises a control valve arrangement for the wheel(s), said control valve arrangement including a magnetic member having a coil and an armature, a valve member having two separate valves disposed in the two brake lines to the wheel(s), and said magnetic member jointly operates said two valves.

2. An anti-blocking control system in accordance with claim 1, wherein said two valves are multi-position valves, and said electromagnet may be charged with differing discrete control outputs, said control valve including barrier springs having a pre-set spring force of which takes effect upon reaching an intermediate position, and in that said spring force and said control output are adjusted to one another such that said valves reach a pre-determined position corresponding with each of the control outputs.

3. An anti-blocking control system as set forth in claim 2, in which said valves are disposed as slide valves.

4. An anti-blocking control system as set forth in claim 1, in which said valves are disposed as slide valves.

* * * * *